United States Patent
Jin et al.

(10) Patent No.: US 10,579,298 B2
(45) Date of Patent: *Mar. 3, 2020

(54) TAPE BACKUP IN LARGE SCALE DISTRIBUTED SYSTEMS

(71) Applicant: International Business Machines Corporation, Armonk, NY (US)

(72) Inventors: Ke Jin, Shenzhen (CN); Chong Zhang, Beijing (CN); Xin Zhang, Shanghai (CN); Kai Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,878

(22) Filed: Apr. 2, 2019

(65) Prior Publication Data

US 2019/0227711 A1 Jul. 25, 2019

Related U.S. Application Data

(63) Continuation of application No. 15/293,888, filed on Oct. 14, 2016.

(51) Int. Cl.
*G06F 3/06* (2006.01)

(52) U.S. Cl.
CPC ............ *G06F 3/065* (2013.01); *G06F 3/061* (2013.01); *G06F 3/067* (2013.01); *G06F 3/0619* (2013.01);

(Continued)

(58) Field of Classification Search
CPC ........ G06F 3/061; G06F 3/0619; G06F 3/065; G06F 3/067; G06F 3/0686; G06F 2212/213
See application file for complete search history.

(56) References Cited

U.S. PATENT DOCUMENTS

| 5,212,772 A ‡ | 5/1993 | Masters | G06F 3/0601 714/20 |
| 6,332,197 B1 ‡ | 12/2001 | Jadav | G06F 11/1076 714/6.1 |

(Continued)

OTHER PUBLICATIONS

Jin et al., "Tape Backup in Large Scale Distributed Systems", U.S. Appl. No. 16/372,878, filed Apr. 2, 2019, 22 pages.‡

(Continued)

*Primary Examiner* — Larry T Mackall
(74) *Attorney, Agent, or Firm* — William H. Hartwell; David K. Mattheis

(57) ABSTRACT

A computer-implemented method includes identifying a source data object of a distributed computing environment. The distributed computing environment includes two or more storage nodes. The source data object exists as two or more slices. At least one of the slices is replicated on at least two storage nodes. The computer-implemented method further includes associating the source data object with a tape. The tape is written by a tape drive controlled from the distributed computing environment. The computer-implemented method further includes copying the source data object to the tape by, for each source slice of the two or more slices, in sequence: selecting a source node of the two or more storage nodes whereon the source slice is replicated, mounting the tape drive to the source node, appending the source slice to the tape, and unmounting the tape drive.

1 Claim, 3 Drawing Sheets

(52) U.S. Cl.
CPC ...... *G06F 3/0686* (2013.01); *G06F 2212/213* (2013.01)

(56) References Cited

U.S. PATENT DOCUMENTS

| | | | | |
|---|---|---|---|---|
| 6,469,854 B1 ‡ | 10/2002 | Gill | ................ | G11B 19/04 360/31 |
| 7,941,404 B2 ‡ | 5/2011 | Garimella | ........... | G06F 11/1464 707/64 |
| 8,561,074 B2 ‡ | 10/2013 | Cherkasova | ........ | G06F 11/1461 718/10 |
| 9,116,851 B2 ‡ | 8/2015 | Hughes | ............... | G06F 11/1456 |
| 9,239,869 B1 ‡ | 1/2016 | Zhang | ............... | G06F 17/30575 |
| 9,268,797 B2 ‡ | 2/2016 | Whitehead | ........... | G06F 11/1451 |
| 9,274,724 B1 ‡ | 3/2016 | Wang | .................... | G06F 3/0686 |
| 9,286,163 B2 ‡ | 3/2016 | Factor | ................ | G06F 11/1402 |
| 9,305,069 B2 ‡ | 4/2016 | Zunger | .................. | G06F 16/27 |
| 2003/0014605 A1 ‡ | 1/2003 | Slater | ................ | G06F 11/1456 711/162 |
| 2003/0041211 A1 ‡ | 2/2003 | Merkey | ............... | G06F 11/1076 711/114 |
| 2004/0098244 A1 ‡ | 5/2004 | Dailey | ................. | G06F 3/0607 703/24 |
| 2009/0138582 A1 ‡ | 5/2009 | Turk | ................... | H04L 67/1002 709/223 |
| 2010/0217796 A1 ‡ | 8/2010 | Palthepu | ................ | G06F 16/182 709/20 |
| 2011/0082972 A1 ‡ | 4/2011 | Cherkasova | ........ | G06F 11/1461 711/11 |
| 2011/0196829 A1 ‡ | 8/2011 | Vickrey | ................ | G06F 16/275 707/62 |
| 2017/0185490 A1 ‡ | 6/2017 | Sridharan | ........... | G06F 11/1464 |
| 2018/0107394 A1 | 4/2018 | Jin | | |
| 2018/0107395 A1 | 4/2018 | Jin | | |

OTHER PUBLICATIONS

IBM, Appendix P. List of IBM Patents or Patent Applications Treated As Related, dated Apr. 3, 2019, 2 pages.‡

Jin et al., "Tape Backup in Large Scale Distributed Systems", U.S. Appl. No. 15/840,001, filed Dec. 13, 2017, 22 pages.‡

IBM, Appendix P, List of IBM Patents or Patent Applications Treated As Related, dated Jan. 9, 2018, 2 pages.‡

‡ imported from a related application

TAPE BACKUP IN LARGE SCALE DISTRIBUTED SYSTEMS

BACKGROUND

The present invention relates generally to the field of tape backup systems, and more particularly to providing efficient coordinated tape backup of large scale distributed systems.

Large scale distributed data systems provide enterprise level virtual computing environments with vast data storage requirements. Users of such environments benefit from the availability of tape backup systems, which provide a high storage volume at a relatively low cost. However, backing up the contents of large distributed environments to tape without significantly affecting the performance of the system remains challenging because the working data may be replicated, sliced, and stored on multiple physical storage devices across the underlying network.

SUMMARY

A computer-implemented method includes identifying a source data object of a distributed computing environment. The distributed computing environment includes two or more storage nodes. The source data object exists as two or more slices. At least one of the two or more slices is replicated on at least two of the two or more storage nodes. The computer-implemented method further includes associating the source data object with a tape. The tape is written by a tape drive controlled from the distributed computing environment. The computer-implemented method further includes copying the source data object to the tape by, for each source slice of the two or more slices, in sequence: selecting a source node of the two or more storage nodes whereon the source slice is replicated, mounting the tape drive to the source node, appending the source slice to the tape, and unmounting the tape drive from the source node.

DETAILED DESCRIPTION

Figure 1A:
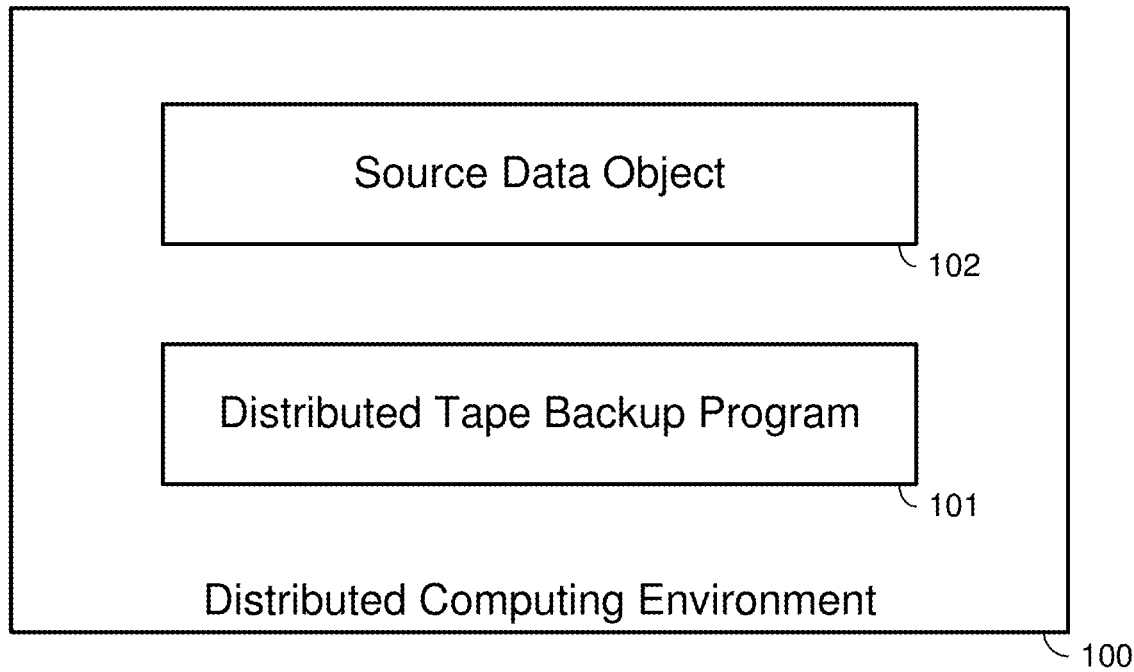
FIG. 1A is block diagram depicting a logical operating environment for a distributed tape backup program, in accordance with at least one embodiment of the invention.

Referring now to the invention in more detail, FIG. 1A is a block diagram depicting a logical operational environment for operation of methods, program products and/or systems, in accordance with a t least one embodiment. The distributed computing environment 100 may be any special or general purpose, virtual computing environment suitable for operating programs and storing data within the context of the environment. The distributed computing environment 100 may operate seamlessly on top of its constituent computers as in a cloud environment, or may operate in a manner that is aware of its distributed implementation, as in a cluster based on Message Passing Interface (MPI) or similar system. In some embodiments, aspects of the invention may be applied to single node environments such as a single physical computer or a single-host virtual environment. In some embodiments, aspects of the invention may be applied to enterprise level distributed environments that provide one or more seamless virtual environments over a large plurality of nodes with capabilities to handle/process large volumes of data.

Referring still to the embodiment depicted in FIG. 1A, a source data object 102 represents any collection of data in a distributed system that is to be backed up. For example, distributed file systems, distributed object storage systems, and distributed block storage systems such as server Storage Area Network ("SAN"), may be treated as a source data object 102 in their entirety or divided into source data objects 102. A source data object 102 may include one or more logical files, objects, tables, etc. within the storage scheme to be backed up, or a source data object 102 may include sections of lower level data and/or ranges of storage addresses in an underlying storage system. In some embodiments, the source data object 102 is limited to a volume of data that fits on a single tape. In such embodiments, programs according to the present invention can divide a large data store into multiple source data objects 102, each associated to a different tape drive 106 available to the distributed system. Where multiple tape drives 106 are available, some embodiments of the invention can include performing the below-disclosed methods in parallel with multiple tapes and/or tape drives 106 to achieve further backup efficiency.

Figure 1B:
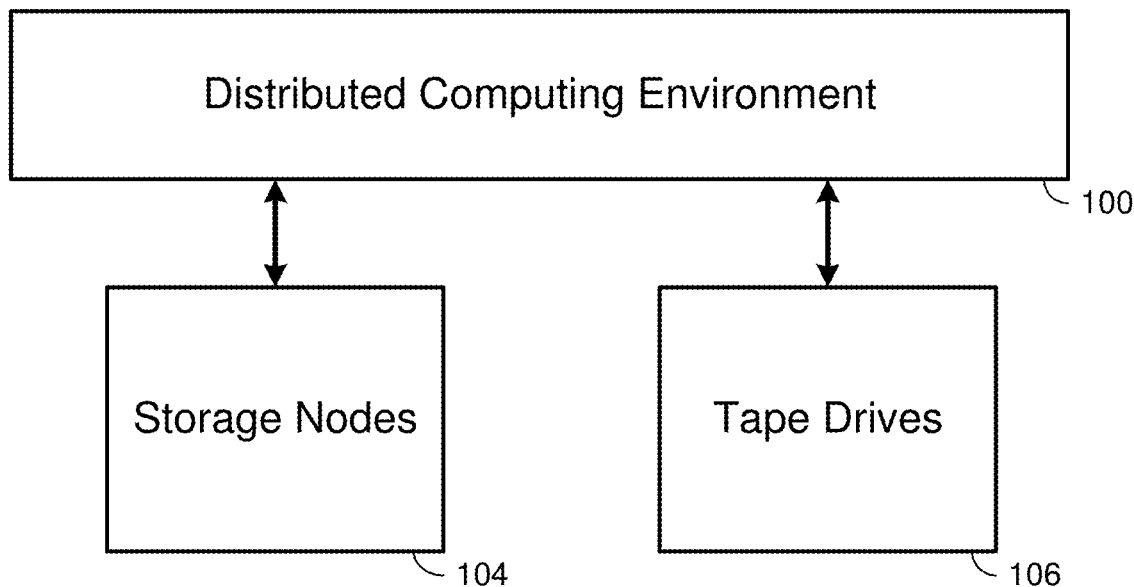
FIG. 1B is a block diagram depicting a network topology for a distributed computing environment, in accordance with at least one embodiment of the invention.

Referring still to the embodiment depicted in FIG. 1A, a distributed tape backup program 101 operates in the distributed computing environment 100. The distributed tape backup program 101 may run in the application layer of the distributed computing environment 100 or in a lower machine-aware and/or storage-aware layer. FIG. 1B depicts an embodiment where the distributed computing environment 100 provides at least one layer in direct or indirect electronic communication with two or more storage nodes 104 and one or more tape drives 106. In an embodiment, the storage nodes 104 are SAN computers using off-the-shelf computer hardware with directly attached storage, and the tape drives 106 are directly connected to off-the-shelf backup nodes (which may be the same physical device(s) as the storage nodes 104) and controlled via a backup program or module. In an embodiment, network computers may be interchangeably mounted to various attached storage devices, both main storage and backup tape drives 106, via Fibre Channel ("FC") and/or Internet Small Computer System Interface ("iSCSI") links. In particular, embodiments of the invention include networks where the attached tape drives 106 may be dynamically mounted and unmounted to and from the various storage nodes 104, thus bringing individual tape drives 106 and tapes topologically close to different data to be backed up.

Figure 2:
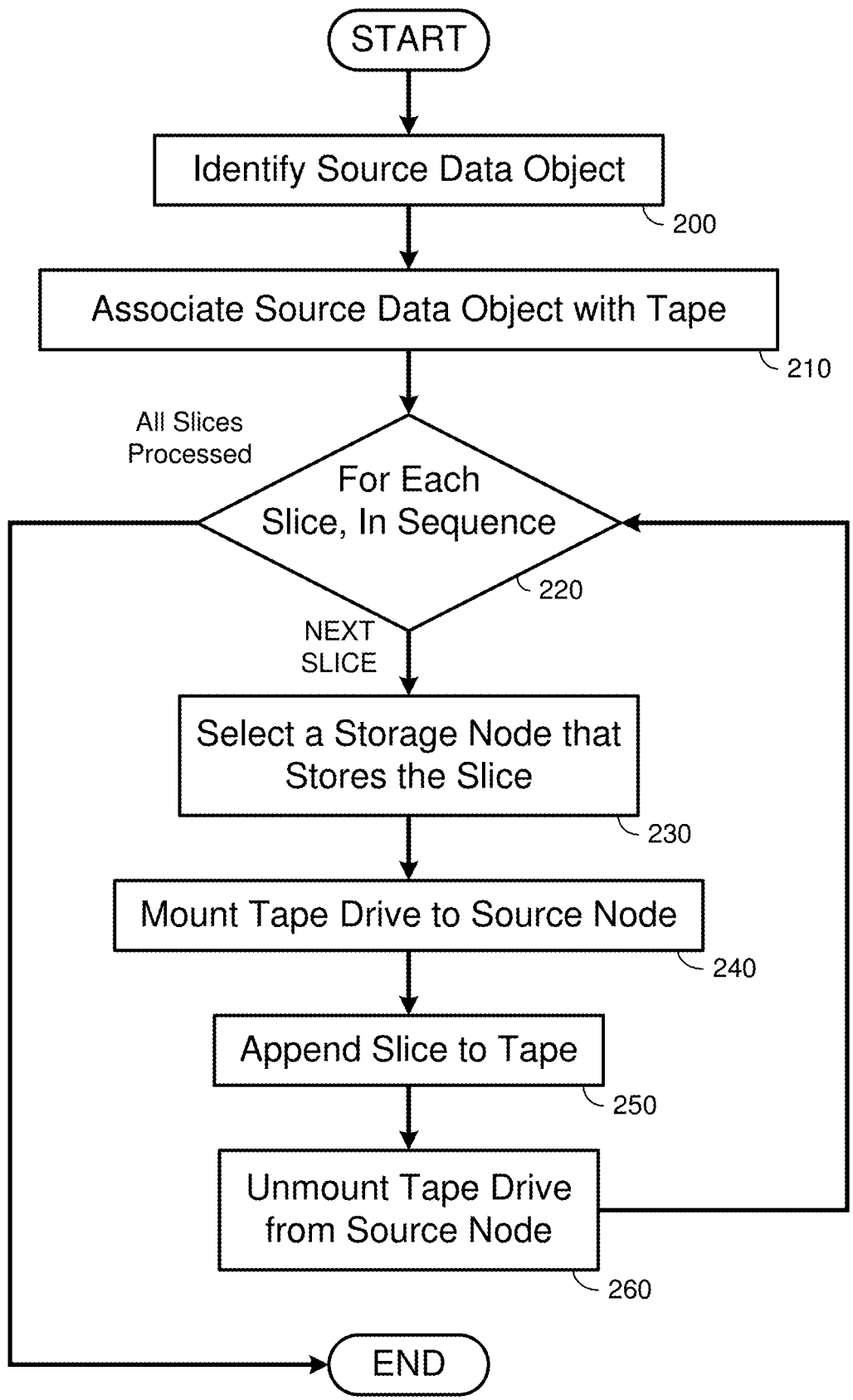
FIG. 2 is a flowchart diagram depicting operational steps for a distributed tape backup program, in accordance with at least one embodiment of the invention.

Referring now to FIG. 2, FIG. 2 is a flow chart diagram for a distributed tape backup program 101, in accordance with at least one embodiment of the invention. In the embodiment depicted in FIG. 2, at step 200, the distributed tape backup program 101 identifies the source data object 102. As discussed above, the source data object 102 may be one of many objects or collections of objects of the distributed computing environment 100 selected for backup. Step 200 may include determining that it is time to perform a full or partial backup according to a schedule or network conditions, determining which files, objects, chunks, tables, etc.

are to be backed up, and dividing such files, objects, chunks, tables, etc. into source data objects 102.

Referring still to the embodiment depicted in FIG. 2, at step 210, the distributed tape backup program 101 associates the source data object 102 with a tape. The tape may be a backup tape cassette inserted into one of the tape drives 106, wherein the tape drive 106 is controlled the distributed computing environment 100. Associating a source data object 102 with a particular tape cassette and/or tape drive 106 can include assigning one of a pool of available tapes to the source data object 102. Assignment can be random, rule based, or a combination of the two. Rule-based assignment may take into account physical network topology, such as alternating the physical locations of assigned tapes to achieve load balancing.

Referring still to the embodiment depicted in FIG. 2, the source data object 102 exists in the distributed computing environment 100 as one or more slices. A slice may be understood as one in a collection of sequential fractions of all of the date of the source data object 102. Each slice may be replicated across multiple of the storage nodes 104. Such replication may be a consequence of the storage architecture of the distributed computing environment 100: for example, the environment may provide efficient access to data by storing distributed copies of portions of the data. In particular, in the depicted embodiment, at least one of the two or more slices is replicated on at least two of the two or more storage nodes 104. In the depicted embodiment, at decision block 220, the distributed tape backup program 101 iterates over each of the slices, in sequence. As used herein, the sequence of the slices may be understood to be that order in which the slices would appear in a data storage medium, if the source data object 102 were to be stored in its entirety on a single medium. More specifically, the distributed tape backup program 101 copies the source data object 102 to the tape by following steps 230-260 for each source slice (a source slice being understood as that slice that is operative in the depicted decision loop), in sequence, as defined above.

Referring still to the embodiment depicted in FIG. 2, at step 230 (decision block 220, NEXT SLICE branch), the distributed tape backup program 101 selects a source node of the two or more storage nodes 104 whereon the source slice is replicated. In some embodiments, each slice may be replicated on many of the storage nodes 104, and the choice of which storage node 104 will provide the source slice copy may be arbitrary and/or random, or such choice may be based on a rule or heuristic. In an embodiment, the distributed tape backup program 101 takes into account the workload level of the source node by selecting a source node that has a low workload relative to peer nodes within the distributed computing environment 100. In another embodiment, the distributed tape backup program 101 takes into account the logical and/or physical proximity on the network underlying the distributed computing environment 100 with the tape drive 106; specifically, the distributed tape backup program 101 selects the source node based on the availability of a high-performance connection between the source node and the tape drive 106. A high performance connection includes direct and/or nearby connections over specialized data storage cabling or protocols. FC and iSCSI are two examples of high performance connections that the inventors have contemplated to be used in the context of embodiments of the present invention.

Referring still to the embodiment depicted in FIG. 2, at step 240, the distributed tape backup program 101 mounts the tape drive 106 of the selected tape to the source node. In some embodiments, mounting can include logical exclusive and/or nonexclusive linking of the tape drive 106 to a file system on the source node, such as using the "mount" utility in UNIX-like systems. Where iSCSI and/or FC connections are used, hardware switching with logical mounting can provide effectively local communication between the source node and the tape drive 106, as if the individual tape drive 106 were directly connected in hardware to the source node, while still providing dynamic mounting between an individual tape drive 106 and at least a subset of the storage nodes 104. In other embodiments, tape drives 106 may be attached to single storage nodes 104. In other embodiments, tape drives 106 may be attached to a central backup module with some or all of the storage nodes 104 mounting the tape drive 106 from a comparatively remote location in the network topology of the distributed computing environment 100. In other embodiments, tapes and/or cassettes or cartridges may be physically transported by human or by machine to fixed tape drives 106 attached to individual storage nodes 104.

Referring still to the embodiment depicted in FIG. 2, at step 250, the distributed tape backup program 101 appends the source slice to the tape. Appending the source slice to the tape can include copying the data content of the source slice to the tape at the tape's existing position without winding the tape back and only winding the tape forward as it is written. In some embodiments, various metadata is stored on the tape wherein the metadata is updated as data is written. In such embodiments, before copying the source data object 102 to the tape, the distributed tape backup program 101 copies the preexisting or fresh tape metadata from the tape to the to the distributed computing environment 100, where the metadata is stored in an object space, name space, variable space, etc. that is accessible to the distributed tape backup program 101 to yield an in-environment metadata and an on-tape metadata such that the in-environment metadata initially mirrors the on-tape metadata. In such embodiments, as each slice is appended to the tape, responsive to appending the slice to the tape, the distributed tape backup program 101 updates the in-environment metadata, but not the on-tape metadata. Accordingly, the tape is not wound back to write the on-tape metadata, even when transferring write authority to a different storage node 104 at the end of the loop. Accordingly, in such embodiments, the distributed tape backup program 101 does not update the on-tape metadata before finishing copying the source data object 102 to the tape.

Referring still to the embodiment depicted in FIG. 2, at step 260, the distributed tape backup program 101 unmounts the tape drive 106 from the source node, for example using a utility similar to the "umount" utility in UNIX-like systems. The distributed tape backup program 101 thus iterates over all of the slices until the entire source data object 102 is copied to the tape (decision block 220 "All Slices Processed" branch). In embodiments that manage in-environment metadata and on-tape metadata, responsive to finishing copying the source data object 102 to the tape, the distributed tape backup program 101 updates the on-tape metadata with the in-environment metadata, which may include winding the tape back to the beginning or back or forward to other positions pertinent to the metadata.

Various embodiments of the invention may incorporate some or all of various features and/or advantages that have been observed and/or recognized by the inventors, though it will be understood that no particular embodiment need necessarily include any of the below-described features or benefits. Such advantages, features, or benefits of some embodiments may include:

Dividing the backup task automatically by the distributed tape backup program 101 by dividing the smallest backup unit, such as the source data object 102, to find out the location of the slices of the copies.

Assigning backup tasks to the server nodes that have FC and/or iSCSI capability and/or lower workload.

Tape drives sharing such that each file, object, or volume is backed up by a specified tape drive that is brought to related backup nodes (either logically or physically) with corresponding data copies one by one.

Reduced backup time because the tape drive is mounted only one time for the file, object, or volume to be backed up.

Fast file reorganization because, after each slice of the file, object, or volume is backed up, the tape is not rewound, and the metadata is not modified. The current metadata of the tape is maintained in the distributed environment, and the next backup node will know the position of the tag in the tape according to this metadata.

Reducing the backup network overhead because all of the data to be backed up in the distributed environment are only transferred once through the SAN network to the tape system.

Reducing the backup time because only one tape mount and rewind operation is carried out for each object to be backed up.

Compatibility with traditional data recovery methods because each file, object, or volume on the tape is saved continuously with no extra workload for the data recovery process.

After capturing the tape drive, the relay node (i.e., next source node) continues to backup data from the current position of the tape, and the rewind and metadata update operations will be carried out when the whole backup task is finished.

Addressing backup requirements for large objects in distributed storage systems. Some embodiments of the present invention may improve the backup efficiency of large files, objects, and/or volumes backup in distributed storage systems, especially when these large files, objects, and/or volumes are sliced among the storage nodes.

Getting multiple nodes working together for large quantity data backup in distributed environments, including tape drive sharing and tape metadata maintenance to reduce tape mounting time and rewinding time.

Backing up data onto traditional tape and Virtual Tape Library ("VTL") system by high performance data transfer protocols such as iSCSI and FC, while still enabling recovery by conventional methods based on tape or VTL.

For large-scale distributed environments, engineers often select some of the nodes as backup nodes and use traditional backup management software (e.g., TSM, NBU, Networker, CommVault, etc.) to backup the whole distributed system to physical or virtual tape systems through SAN network. During the whole process of backing up for the large-scale distributed system, data is transferred from all the data nodes to the backup nodes first, and then the data is transferred to the tape system in the SAN environment. The inventors have observed and/or recognized that this causes a high workload on the network, and that the efficiency of the whole backup procedure is low because the data has to be transferred by Ethernet and SAN network several times. Thus, some, but not necessarily all embodiments of the present invention address this problem by distributing the backup load.

For small-scale environments with most of the nodes having backup capability through FC and/or iSCSI, backup management software can setup policies for files, objects, and/or volumes to be backed up by appropriate nodes. The inventors have observed and/or recognized that, according to known backup policies, each file, object, and/or volume can only be backed up by one node at a time, and data still need to be converged through an Ethernet network for large files, objects, and/or volumes because such files, objects, and/or volumes are sliced and/or replicated throughout the distributed system. The inventors have further observed and/or recognized that, only after that, the large files, objects, and/or volumes can be backed up to the tape system through the SAN network, which still causes extra workload on the network, which may be alleviated by some, but not necessarily all embodiments of the invention.

In order to reduce the network overhead, the inventors have observed and/or recognized that at least some embodiments of the invention can provide data reconstruction during the backup process because data is only needed to be transferred once during backing up to the physical or virtual tape system, and this solution may be particularly effective for large files, objects, and/or volumes.

Further, the inventors have observed and/or recognized that, for general distributed systems, files or objects are usually stored with two or more replicas and may be sliced before being stored on the data nodes with various conventional algorithms such as erasure coding. Accordingly, various embodiments of the invention include a logical architecture wherein n storage nodes 104 communicate with k tape drives 106 over the distributed computing environment 100, with the k tape drives 106 having access to a tape library with one or more tape cartridge pools, which maybe handled, changed, loaded, and/or stored manually or by machine. In such embodiments, n is much larger than k. In such embodiments, the distributed computing environment 100 includes or is in communication with a physical logical backup management server, which may run the distributed tape backup program 101.

In such embodiments, the backup management server controls and monitor the whole backup process as well as the sequence of the source data objects 102 to be backed up and the assignment of the tape drives 106. Similarly, the backup management server is configured to address and recover from failures in data nodes, tape drives 106, backup paths, etc. In such embodiments, a set of objects are selected to be backed up to the tape system by a limited number of tape drives 106, and each object has several slices or copies distributed on different data nodes. Each object is backed up by one tape drive 106 which can guarantee the consistency of the object, according to the above-described methods for the distributed tape backup program 101. Considering backup efficiency and load balance, in such embodiments the tape drives 106 do not wait for a single data node. If slices of the different objects to be backed up are located on the same data node, then some tape drives 106 are brought (either logically or physically) to other data nodes which copies of the object slices.

Figure 3:
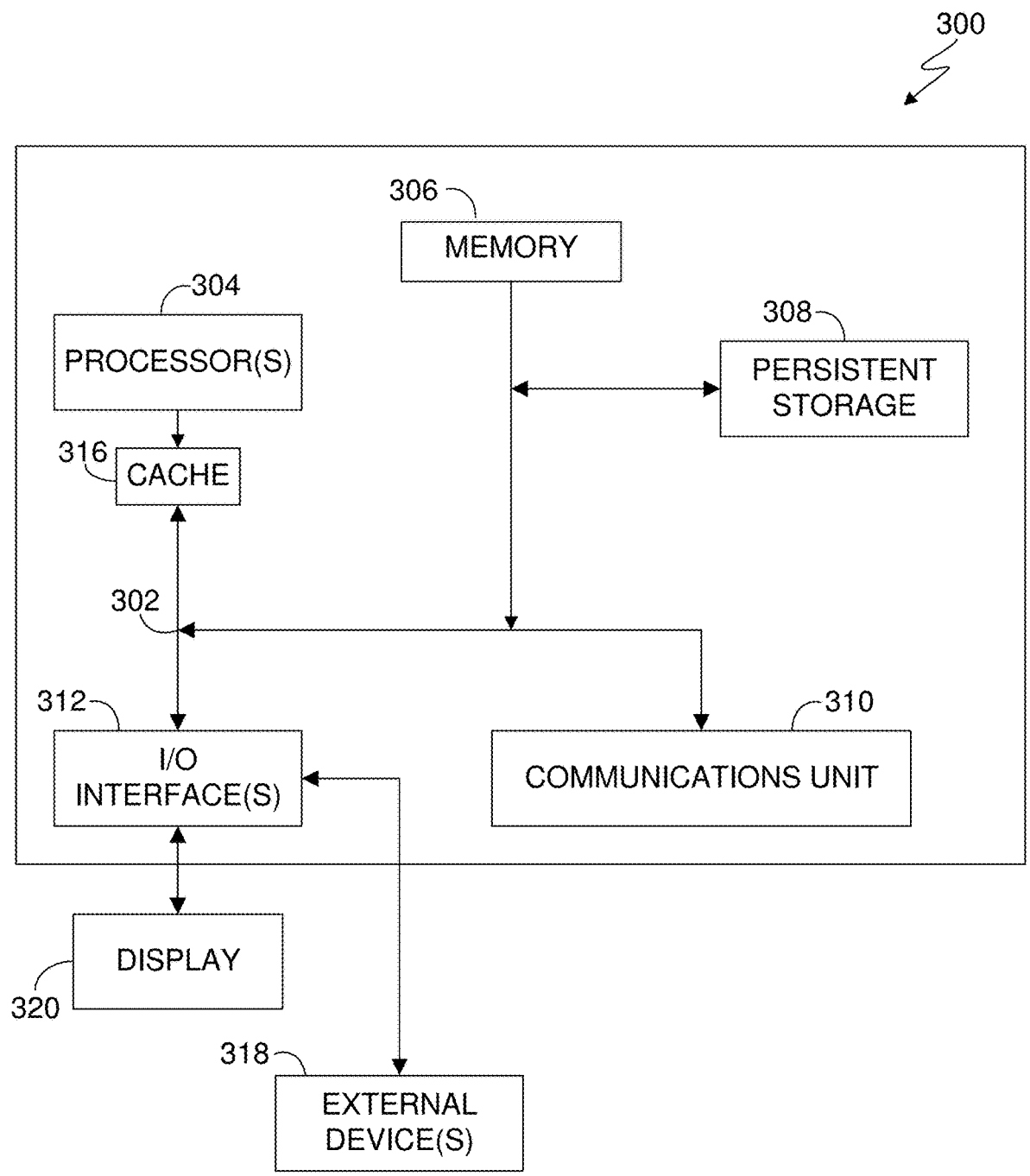
FIG. 3 is a block diagram depicting various logical elements for a computer system capable of executing program instructions, in accordance with at least one embodiment of the present invention.

FIG. 3 is a block diagram depicting components of a computer 300 suitable for executing the distributed tape backup program 101. FIG. 3 displays the computer 300, the one or more processor(s) 304 (including one or more computer processors), the communications fabric 302, the memory 306, the RAM, the cache 316, the persistent storage 308, the communications unit 310, the I/O interfaces 312, the display 320, and the external devices 318. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the cache 316, the computer processor(s) 304, the memory 306, the persistent storage 308, the communications unit 310, and the input/output (I/O) interface(s) 312. The communications fabric 302 may be implemented with any architecture suitable for passing data and/or control information between the processors 304 (e.g. microprocessors, communications processors, and network processors, etc.), the memory 306, the external devices 318, and any other hardware components within a system. For example, the communications fabric 302 may be implemented with one or more buses or a crossbar switch.

The memory 306 and persistent storage 308 are computer readable storage media. In the depicted embodiment, the memory 306 includes a random access memory (RAM). In general, the memory 306 may include any suitable volatile or non-volatile implementations of one or more computer readable storage media. The cache 316 is a fast memory that enhances the performance of computer processor(s) 304 by holding recently accessed data, and data near accessed data, from memory 306.

Program instructions for the distributed tape backup program 101 may be stored in the persistent storage 308 or in memory 306, or more generally, any computer readable storage media, for execution by one or more of the respective computer processors 304 via the cache 316. The persistent storage 308 may include a magnetic hard disk drive. Alternatively, or in addition to a magnetic hard disk drive, the persistent storage 308 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 310, in these examples, provides for communications with other data processing systems or devices. In these examples, the communications unit 310 may include one or more network interface cards. The communications unit 310 may provide communications through the use of either or both physical and wireless communications links. Distributed tape backup program 101 may be downloaded to the persistent storage 308 through the communications unit 310. In the context of some embodiments of the present invention, the source of the various input data may be physically remote to the computer 300 such that the input data may be received and the output similarly transmitted via the communications unit 310.

The I/O interface(s) 312 allows for input and output of data with other devices that may operate in conjunction with the computer 300. For example, the I/O interface 312 may provide a connection to the external devices 318, which may include a keyboard, keypad, a touch screen, and/or some other suitable input devices. External devices 318 may also include portable computer readable storage media, for example, thumb drives, portable optical or magnetic disks, and memory cards. Software and data used to practice embodiments of the present invention may be stored on such portable computer readable storage media and may be loaded onto the persistent storage 308 via the I/O interface(s) 312. The I/O interface(s) 312 may similarly connect to a display 320. The display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying a source data object of a distributed computing environment, wherein the distributed computing environment comprises two or more storage nodes, wherein the source data object exists as two or more slices, and wherein at least one of the two or more slices is replicated on at least two of the two or more storage nodes;
associating the source data object with a tape, wherein the tape is written by a tape drive controlled from the distributed computing environment;
copying metadata of the two or more slices from the tape to the distributed computing environment to yield an in-environment metadata and an on-tape metadata;
copying the source data object to the tape without rewinding the tape and without updating the on-tape metadata during the copying, wherein the copying comprises, for each source slice of the two or more slices, in sequence:
selecting a source node of the two or more storage nodes whereon the source slice is replicated, wherein the source node is selected based on: (i) a workload level of the source node being low relative to other nodes of the two or more storage nodes, (ii) a logical and/or physical proximity of the source node to the tape drive, and (iii) an availability of a high-performance connection between the source node and the tape drive, and wherein the high-performance connection comprises at least one of a fibre channel connection and an internet small computer system interface connection,
mounting the tape drive to the source node, using hardware switching with logical mounting,
appending the source slice to the tape,
responsive to appending the source slice to the tape, updating the in-environment metadata, and
unmounting the tape drive from the source node; and
responsive to finishing copying the source data object to the tape, updating the on-tape metadata with the in-environment metadata,
wherein the copying of the two or more slices of the source data object to the tape and the updating of the on-tape metadata with the in-environment metadata includes performing only a single tape rewind operation.

* * * * *